United States Patent
Lew et al.

(10) Patent No.: US 8,880,553 B2
(45) Date of Patent: Nov. 4, 2014

(54) REDISTRIBUTE NATIVE XML INDEX KEY SHIPPING

(71) Applicant: International Business Machines Corporation, Armonk, NY (US)

(72) Inventors: Ivan Lew, Toronto (CA); Aleksandrs Santars, Toronto (CA); Adil M. Sardar, Toronto (CA); David Tremaine, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/971,597

(22) Filed: Aug. 20, 2013

(65) Prior Publication Data

US 2014/0025652 A1 Jan. 23, 2014

Related U.S. Application Data

(63) Continuation of application No. 13/074,747, filed on Mar. 29, 2011, now Pat. No. 8,543,600.

(51) Int. Cl.
    *G06F 17/30* (2006.01)
(52) U.S. Cl.
    CPC .............. *G06F 17/30336* (2013.01)
    USPC ........... 707/781; 707/792; 707/795; 707/796; 707/804; 707/822
(58) Field of Classification Search
    CPC ................................................. G06F 17/30705
    USPC .......... 707/792, 795, 796, 804, 822, 966, 781
    See application file for complete search history.

(56) References Cited

U.S. PATENT DOCUMENTS

| | | | |
|---|---|---|---|
| 7,440,954 B2 | 10/2008 | Murthy et al. | |
| 7,698,346 B2 * | 4/2010 | Henderson | 707/781 |
| 7,792,798 B2 | 9/2010 | Tremaine et al. | |
| 7,984,067 B2 * | 7/2011 | Henderson | 707/781 |
| 2007/0220033 A1 | 9/2007 | Sanders | |
| 2007/0220420 A1 | 9/2007 | Sanders | |
| 2007/0260476 A1 | 11/2007 | Smolen et al. | |

(Continued)

OTHER PUBLICATIONS

Mahboubi, Hadj et al., A Join Index for XML Data Warehouses, 2008 International Conference on Information Resources Management, May 18-20, 2008, Paper 5, http://hal.archives-ouvertes.fr/docs/00/32/06/69/PDF/join-index-xml-dw-final.pdf.

(Continued)

*Primary Examiner* — Sana Al Hashemi
(74) *Attorney, Agent, or Firm* — Patterson & Sheridan, LLP

(57) ABSTRACT

Techniques are described for data redistribution. Embodiments store a first set of receiver location identifiers mapped to a document identifier and assigned to a first set of receiver locations storing relational data referencing the document identifier. Embodiments store a second set of receiver location identifiers mapped to the document identifier and assigned to a second set of receiver locations storing document data corresponding to the document identifier referenced by the relational data. Sender index keys are received separately from the relational data and the document data, the sender index keys referencing the document identifier and containing sender location identifiers. Embodiments determine, from the first set of receiver location identifiers and the second set of receiver location identifiers, which receiver location identifiers are mapped to the document identifier referenced by the sender index keys. The sender location identifiers are then replaced with the determined receiver location identifiers.

20 Claims, 5 Drawing Sheets

(56) References Cited

U.S. PATENT DOCUMENTS

2007/0299811 A1 12/2007 Chandrasekar et al.
2009/0112858 A1 4/2009 Zhang et al.
2010/0161707 A1* 6/2010 Henderson .................... 709/202
2011/0289061 A1 11/2011 Lew et al.

OTHER PUBLICATIONS

Abiteboul, S. et al., WebContent: Efficient P2P Warehousing of Web Data, Proceedings of the VLDB Endowment, Aug. 2008, pp. 1428-1431, vol. 1, Issue 2, ACM, New York, New York, US.

Beyer, Kevin et al, System RX: One Part Relational, One Part XML, Proceedings of the 2005 ACM SIGMOD international conference on Management of data, Jun. 14-16, 2005, pp. 347-358, ACM, New York, New York, US.

Grabs, Torsten et al., XMLTM: Efficient Transaction Management for XML Documents, Proceedings of the eleventh international conference on Information and knowledge management, Nov. 4-9, 2002, pp. 142-152, ACM, New York, New York, US.

Beyer, K. et al., DB2 goes hybrid: Integrating native XML and XQuery with relational data and SQL, IBM Systems Journal, 2006, pp. 271-298, vol. 45, No. 2, International Business Machines Corporation, Yorktown Heights, New York, US.

Nicola, Matthias et al., Native XML Support in DB2 Universal Database, Proceedings of the 31st international conference on very large data bases, Aug. 30-Sep. 2, 2005, pp. 1164-1174, ACM, New York, New York, US.

* cited by examiner

REDISTRIBUTE NATIVE XML INDEX KEY SHIPPING

CROSS REFERENCE TO RELATED APPLICATIONS

This application is a continuation of co-pending U.S. patent application Ser. No. 13/074,747, filed Mar. 29, 2011, which claims foreign priority benefits under 35 U.S.C. §119 to co-pending Canadian patent application number CA 2702133 filed May 21, 2010. The related patent applications are herein incorporated by reference in their entirety.

BACKGROUND

Relational database management systems, such as DB2® Universal Database™ (DB2 UDB), incorporate a shared-nothing architecture. A shared-nothing architecture is a distributed computing architecture in which each node is independent and self-sufficient, and there is no single point of contention across the system. This allows the use of independent computer servers (partitions) to own and store a portion of the data and share a CPU workload. This data ownership may be controlled by data partitioning, and the ownership may need to be altered in certain scenarios. For example, when the database manager capacity does not meet present or future business needs, the system capacity may need to be changed by adding or removing physical machines. As another example, the data ownership may need to be changed when the existing data distribution is not even or is inconsistent with machine processing power. For instance, data may be evenly distributed among database partitions, but some database partitions may be hosted by physical machines that are comparatively weak to other machines in the cluster.

To change data ownership, existing data may be redistributed among the machines in the cluster. This operation is called "data redistribution," and may operate on all participating database partitions in parallel. On any given partition, a data redistribution utility may scan the data, and determine whether each record should stay on the respective partition or should be redistributed to some other partition. Upon determining a record should be redistributed, the data redistribution utility may redistribute the record to another partition in the cluster. However, once such redistribution occurs, the indices on the other partition must be rebuilt to account for the newly distributed record. Such rebuilding may require multiple scans of relational tables, reads of various database objects, and numerous sort operations. As a result, such rebuilding of the index may consume significant system resources and CPU cycles.

SUMMARY

Embodiments of the invention provide a method, system and computer program product for redistributing data in a database system. The method, system and computer program product include storing in a temporary table a first set of receiver location identifiers mapped to a document identifier, the first set of receiver location identifiers assigned to a first set of receiver locations storing relational data referencing the document identifier, the relational data received from a sender partition. Additionally, the method, system and computer program product include storing in the temporary table a second set of receiver location identifiers mapped to the document identifier, the second set of receiver location identifiers assigned to a second set of receiver locations storing document data corresponding to the document identifier referenced by the relational data, the document data received from the sender partition separately from the relational data. The method, system and computer program product further include receiving from the sender partition separately from the relational data and the document data, sender index keys referencing the document identifier, the sender index keys further comprising sender location identifiers. The method, system and computer program product also include determining from the temporary table the receiver location identifiers mapped to the document identifier referenced by the sender index keys. Further, the method, system and computer program product include modifying the sender index keys by replacing the sender location identifiers with the determined receiver location identifiers.

In one aspect of the present invention, the relational data references an XML identifier, and the document data comprises XML data corresponding to the XML identifier referenced by the relational data. The receiver location identifiers comprises a receiver record identifier (RID) assigned to a record at the receiver partition storing the relational data, and an XID assigned to record slots on XML pages at the receiver partition storing the XML data. The receiver partition extracts the XML document identifiers referenced by the index keys received from the sender partition, retrieves the RID's and XID's mapped to the XML identifier from the temporary table, replaces the sender RID's in the index keys with the retrieved receiver RID's, and replaces the sender XID's in the index keys with the retrieved receiver XID's.

DETAILED DESCRIPTION

Figure 1:
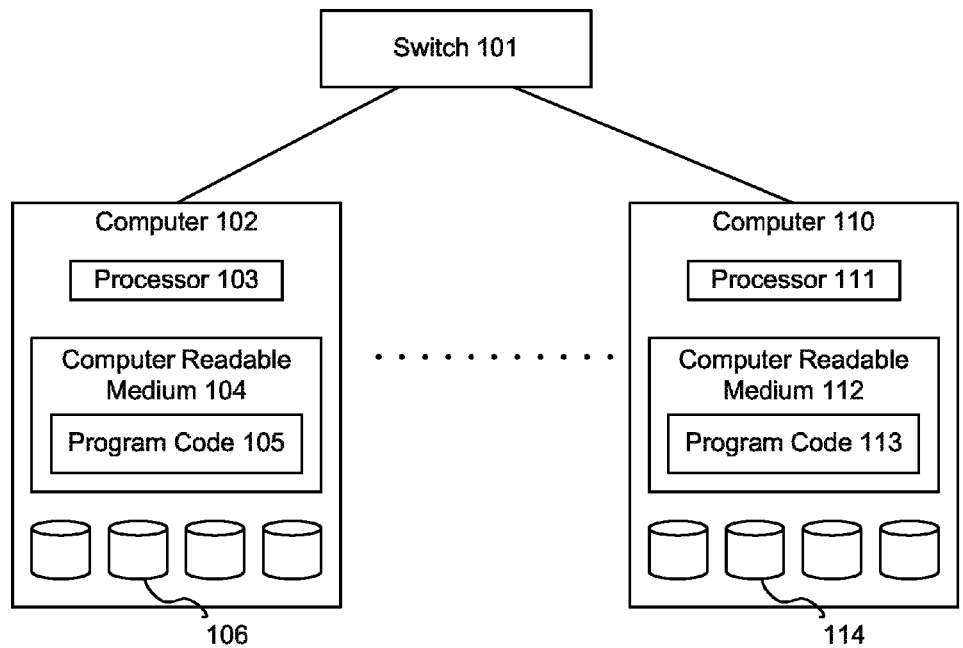
FIG. 1 illustrates an embodiment of a system implementing the data redistribution method of the present invention.

A relational database management system may support the ability to store extensible markup language (XML) documents natively as XML columns within relational tables. In such a configuration, the XML document is broken into many smaller pieces (or "regions") so that the document be stored efficiently as one or more XML pages. Such XML pages may be stored in a database table separately from the table where relational objects are stored. The relational objects in turn may be stored in records assigned unique record identifiers (RID). In such a configuration, the relational objects do not contain the XML region itself, but instead contain the unique XML Document Identifier (also referred to herein as a "Doc ID") to refer to the corresponding XML regions. The Doc ID may be unique across the database system, and may refer to one or more XML regions indirectly through a lookup index (also referred to herein as a "regions index") described further below.

In such a configuration, three indexes may be used to support the storage of XML documents natively: XML Regions Index, XML Path Index, and XML Values Index. The XML Regions Index stores a mapping between the Doc ID unique XML page identifiers (also referred to herein as "XID"). Each XID may identify the XML page and slot entry for locating the XML region. When retrieving a relational object having Doc ID's, one or more region indices may be utilized to locate the XML regions referred by the Doc ID's, and return the referred XML regions along with the relational object retrieved. The XML Path Index may record all unique paths which exist in the XML documents within an XML column. The recorded paths may be used, for instance, to improve the performance of index look-ups during query processing. The XML Path Index may map a string of XML paths to a Path ID. The XML Values index may store a path ID, a value, a base table RID, and a Doc ID. The XML Values Index helps queries find both the owning relational row and the XML Document.

When creating the XML indexes from scratch (i.e., through scans of the base tables), the aforementioned three XML indexes must be built in the order of Regions Index, Path Index, and Values Index, due to the dependencies among the indexes. That is, building the regions index require scanning the XML object, building the path index requires scans of the regions index and retrieving regions in document order, and building the values index requires scanning the relational table for Doc ID and base table RID, and then using the regions index to retrieve the regions in document order and path indexes lookups.

During data redistribution, the relational objects being redistributed, along with their referenced XML regions, are moved from the sending partitions to the target receiver partitions. However, once such redistribution occurs, the XML indices must also be rebuilt accurately at each receiver partition. One approach is to first move the relational object and the XML regions to the receiver partitions. Then, each receiver partition could scan the tables containing the newly moved data and rebuild the XML indexes in the proper order. However, this requires multiple scans of the relational tables and reads of the XML object, as well as several sorts. These operations require significant resources and CPU cycles.

As such, embodiments of the invention provide techniques for redistributing data in a database system. Such techniques include storing a first set of receiver location identifiers mapped to a document identifier, the first set of receiver location identifiers assigned to a first set of receiver locations storing relational data referencing the document identifier. Embodiments of the invention further store a second set of receiver location identifiers mapped to the document identifier. Here, the second set of receiver location identifiers are assigned to a second set of receiver locations storing document data corresponding to the document identifier referenced by the relational data. Sender index keys are also received, separately from the relational data and the document data. The received sender index keys reference the document identifier, as well as contain sender location identifiers. Embodiments of the invention determine, from the first set of receiver location identifiers and the second set of receiver location identifiers, which receiver location identifiers are mapped to the document identifier referenced by the sender index keys. Embodiments then replace the sender location identifiers with the determined receiver location identifiers. Advantageously, by doing so, embodiments may avoid recreating the entire index from scratch during a data redistribution operation, thus improving the efficiency of the data redistribution process.

Referring now to FIG. 1, FIG. 1 illustrates an embodiment of a system implementing the data redistribution method of the present invention. As shown, the system comprises a plurality of computers, such as computers 102 and 110, operatively coupled through a switch 101 in a shared-nothing architecture. Each computer 102, 110 is operatively coupled to a processor 103, 111 and a computer readable medium 104, 112. The computer readable medium 104, 112 stores computer readable program code 105, 113 for implementing the data redistribution method according to the various embodiments of the present invention. Each computer 102, 110 includes storage media 106, 114 for storing a portion of the database data that the computer 102, 110 owns.

Figure 2:
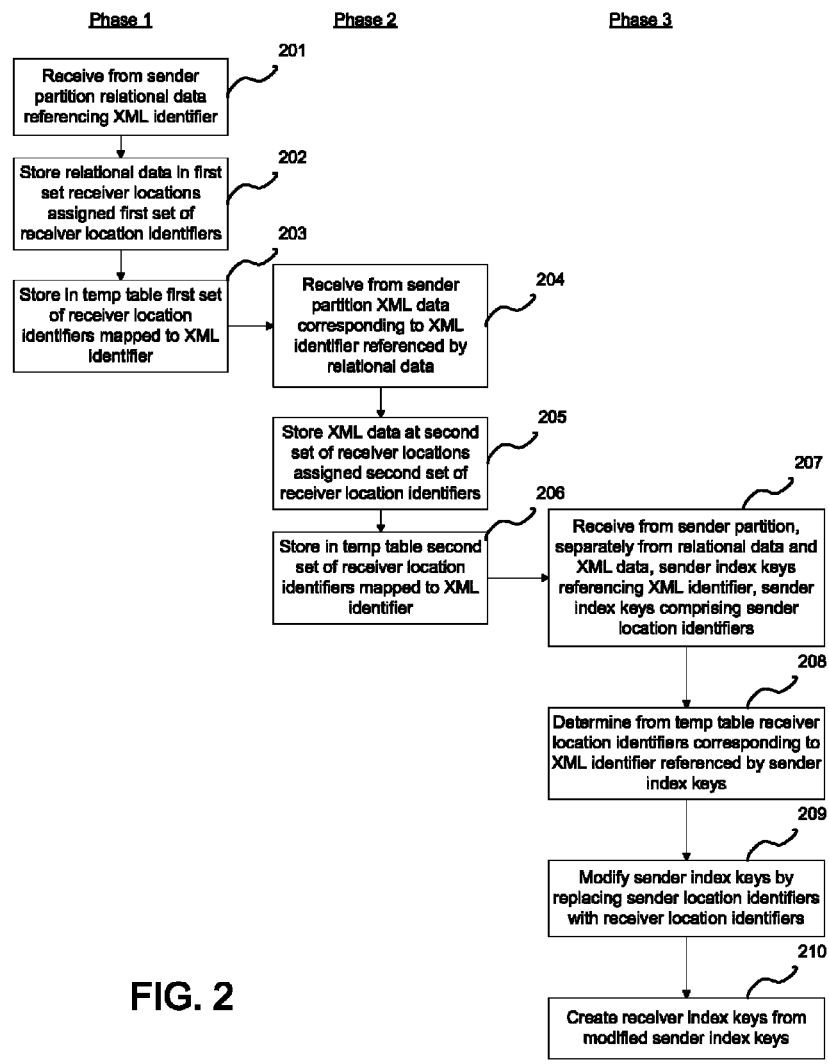
FIG. 2 is a flowchart illustrating an embodiment of the data redistribution method of the present invention.

FIG. 2 is a flowchart illustrating an embodiment of the data redistribution method of the present invention. In this embodiment, the data redistribution is implemented as a three phase process. In the first phase, relational data to be redistributed, representing relational objects, are moved from sender partitions to receiver partitions. In the second phase, the XML data to be redistributed, representing XML objects referenced by the relational data, are moved from the sender partitions to the receiver partitions. After the first and second phases complete, a third phase ships the index keys for the redistributed relational and XML from the sender partitions to the receiver partitions.

Assume in FIG. 1, data at computer 102 is to be redistributed to computer 110. Computer 102 thus is a sender partition, and computer 110 is a receiver partition. Referring now to FIGS. 1 and 2, the data redistribution method begins with the first phase of operations at step 201, where the receiver partition 110 receives from the sender partition 102 relational data referencing an XML identifier. Here, the XML identifier uniquely identifies an XML document ("Doc ID"). The receiver partition 110 stores the relational data at a first set of receiver locations assigned a first set of receiver location identifiers (step 202). The receiver partition 110 also stores in a temporary table the first set of receiver location identifiers mapped to the XML identifier (step 203). In this embodiment, the relational data are stored in receiver records assigned record identifiers (RID's).

After the completion of the first phase, the data redistribution method performs the second phase. During this second phase, the receiver partition 110 receives from the sender partition 102 XML data corresponding to the XML identifier referenced by the relational data (step 204). The relational data was received by the receiver partition 110 during the first phase. The receiver partition 110 stores the XML data in a second set of receiver locations assigned a second set of receiver location identifiers (step 205). The receiver partition 110 also stores in the temporary table the second set of receiver location identifiers mapped to the XML identifier (step 206). In this embodiment, the XML data are stored in one or more XML pages as regions with slot entries assigned XML record identifiers (XID).

After the completion of the first and second phases, the data redistribution method performs the third phase. During the third phase, the receiver partition 110 receives from the sender partition 102 the sender partition's index keys referencing the XML identifier (step 207), which also comprises sender location identifiers. The sender location identifiers reference the locations at the sender where the relational XML data are stored. The location identifiers are partition specific, thus the sender location identifiers are only relevant to the sender partition. These sender index keys include the relational data index, the XML Regions Index, the XML Path Index, and the XML Values Index. These sender index keys are received separately from the relational data and the XML data. The receiver partition 110 then determines from the temporary table the receiver RID's corresponding to the XML identifier referenced by the sender index keys (step 208). The receiver partition 110 modifies the sender index keys by replacing the sender location identifiers with the receiver location identifiers from the temporary table (step 209). To ensure that the receiver index keys reference the correct locations, the receiver location identifiers to which the relational and XML data are written are collected in the temporary table during their processing. This collected data are then used to modify the sender index keys to accurately reference the receiver locations. The receiver partition 110 then creates the receiver index keys from the modified sender index keys (step 210).

Figure 3:
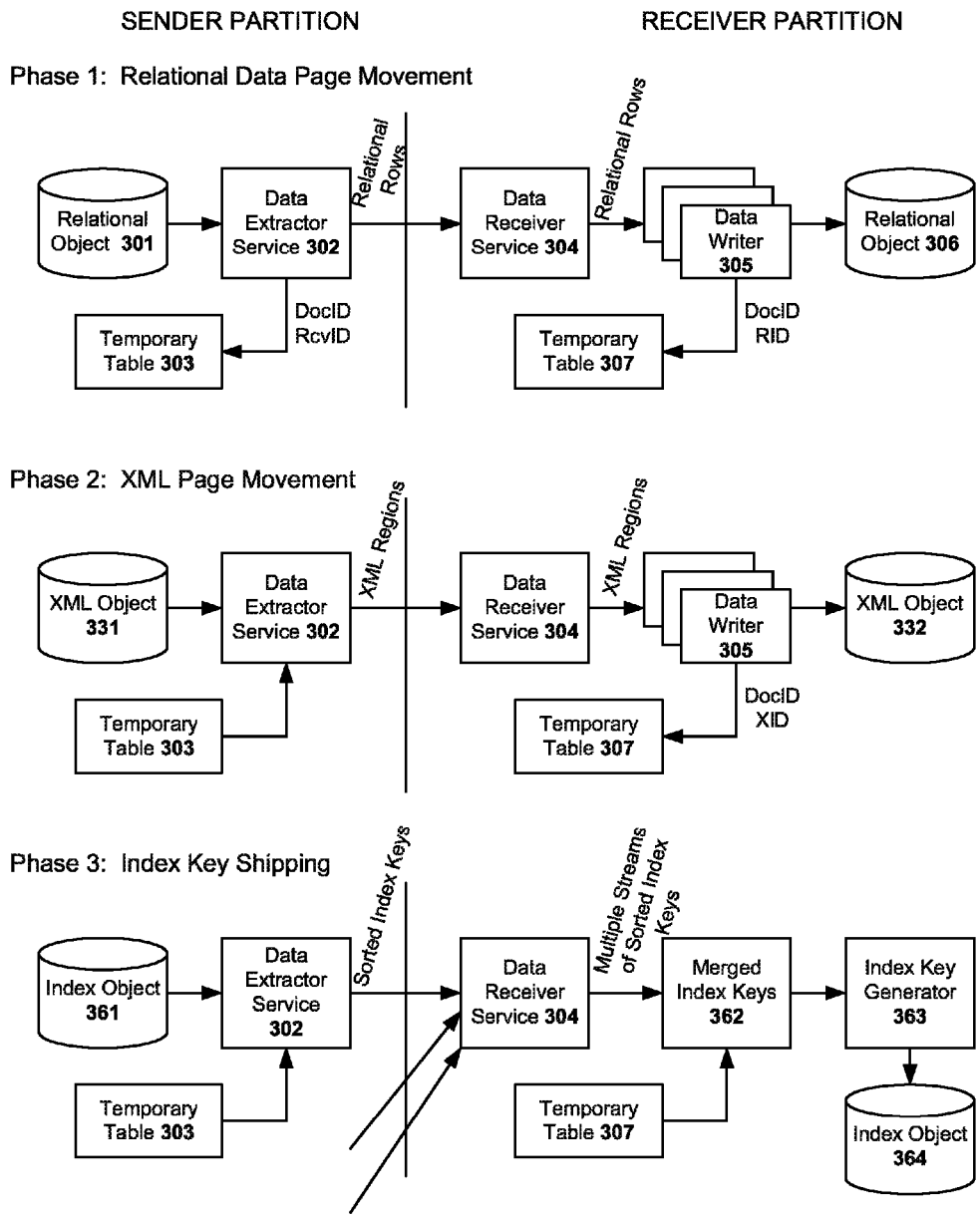
FIG. 3 is a block diagram illustrating in more detail the embodiment of the data redistribution of the present invention.
Figure 4A:
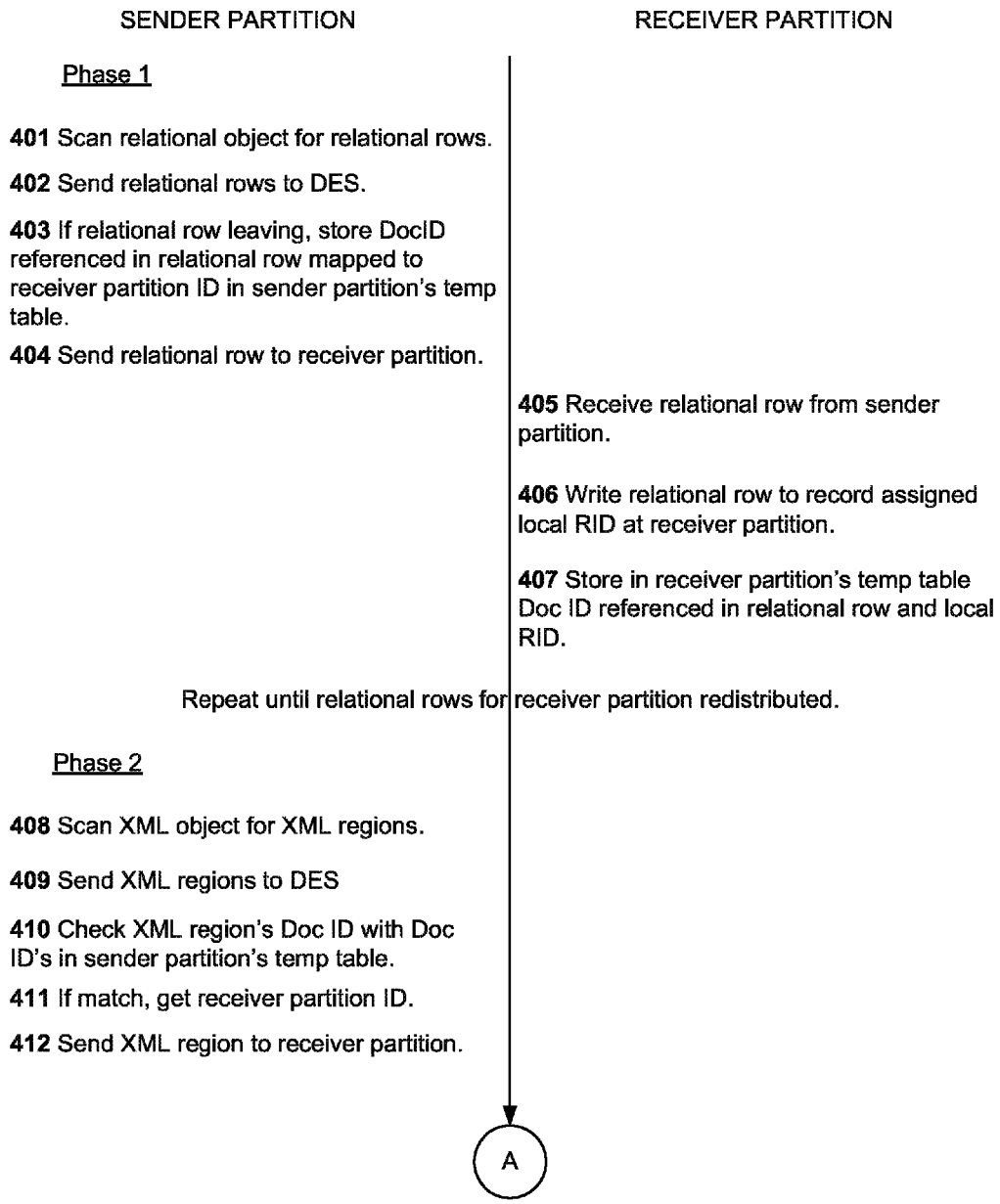
FIGS. 4A-4B is a process flow diagram illustrating in more detail the embodiment of the data redistribution of the present invention.
Figure 4B:
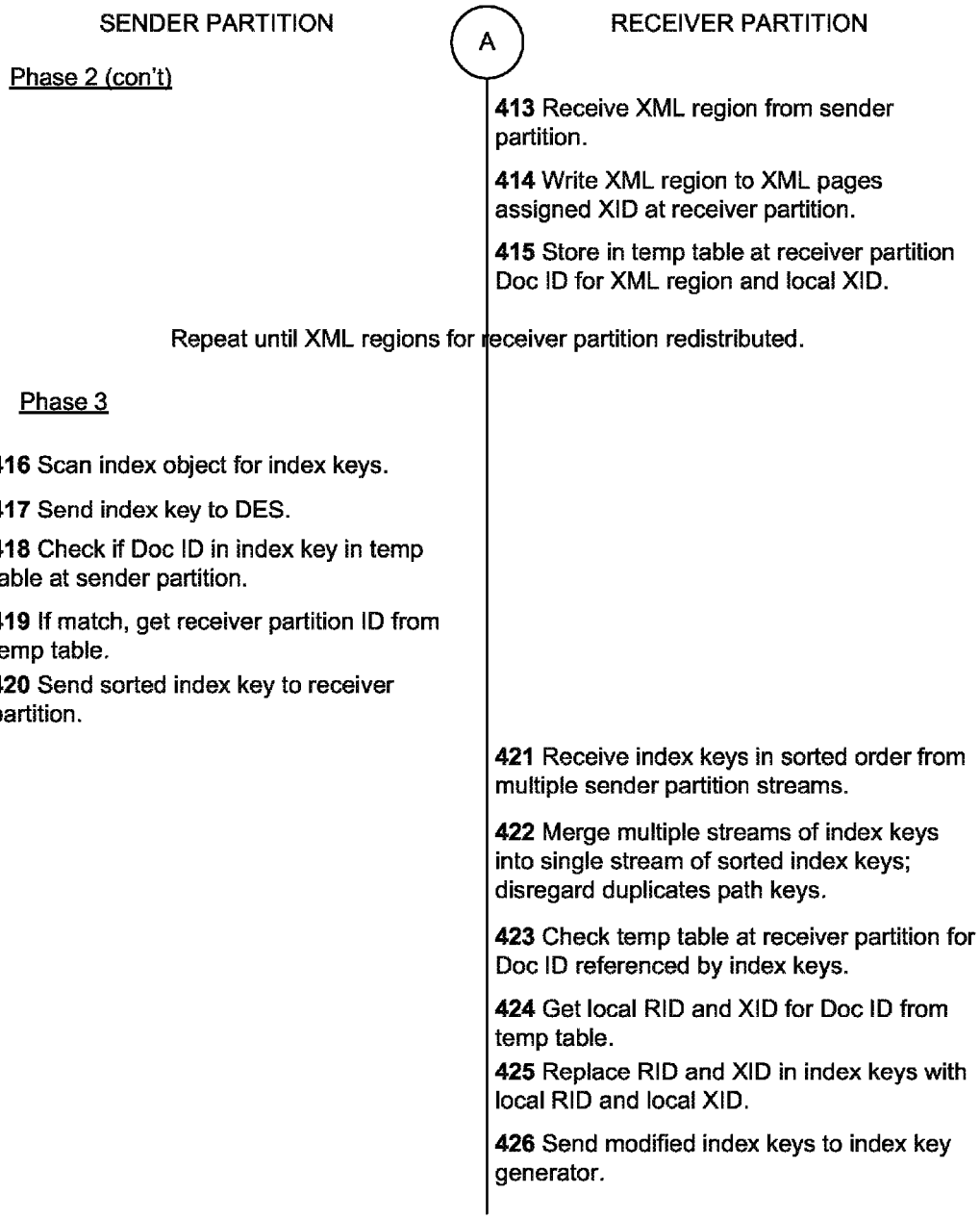

FIGS. 3 and 4A-4B are a block diagram and a process flow diagram, respectively, illustrating embodiments of the data redistribution of the present invention. As shown in FIG. 4A, the data redistribution method begins during the first phase of the data redistribution at step 401, where the sender partition 102 scans the relational object 301 to be evaluated for redistribution for relational rows, and then sends the relational rows to a data extractor service 302 ("DES") (step 402). The DES 302 processes each relational row to determine if a particular row is staying or leaving (i.e., to determine whether the particular row is to be redistributed). If the particular row is leaving, then the DES 302 extracts the XML identifier (or "Doc ID") referenced in the row. This Doc ID is stored in a temporary table 303 at the sender partition 102 and mapped to a receiver partition ID for a receiver partition to which the row is moving (step 403). The DES 302 then sends the relational row to the receiver partition 110 (step 404). The DES 302 may buffer multiple relational rows and then send the buffer of rows to the receiver partition 110.

A data receiver service 304 ("DRS") at the receiver partition 110 receives the relational row from the sender partition 102 (step 405). A data writer 305 writes the relational row to disk in a record at the receiver partition 110 (step 406). Additionally, the record at which the relational row is written may be assigned a local record identifier ("RID"). In such a scenario, the data writer 305 stores this local RID mapped to the Doc ID referenced in the relational row in a temporary table 307 at the receiver partition 110 (step 407).

At the end of the first phase, relational rows to be redistributed have been sent to the receiver partition 110 and stored at the receiver partition 110 as a relational object 306. The temporary table 303 at the sender partition 102 comprises the Doc ID's referenced by the relational rows sent to the receiver partition 110. The temporary table 307 at the receiver partition 110 comprises the location identifiers for the relational rows written to disk at the receiver partition 110.

After the first phase completes, the second phase of the data redistribution is performed. During the second phase, the sender partition 102 scans the XML object 331 for XML regions (step 408) and sends the XML regions to the DES 302 (step 409). The DES 302 extracts the Doc ID referenced in the XML region and performs a lookup in the temporary table 303 for a matching Doc ID (step 410). If there is a match, then this particular XML region is to be redistributed. The DES 302 gets the receiver partition ID mapped to the matching Doc ID from the temporary table 303 (step 411) and sends the XML region to the identified receiver partition 110 (step 412). The DES 302 may buffer the XML regions and then send the buffer of regions to the receiver partition 110.

The DRS 304 at the receiver partition 110 receives the XML region from the sender partition 102 (step 413). The data writer 305 writes the XML region to disk at one or more XML pages assigned an XID at the receiver partition 110 (step 414). The data writer 305 stores the local XID mapped to the Doc ID referenced in the XML region in the temporary table 307 (step 415). Thus, by the end of the second phase, XML regions to be redistributed have been sent to the receiver partition 110 and stored at the receiver partition 110 as an XML object 332. The temporary table 307 at the receiver partition 110 comprises the XID's for the XML regions written to disk at the receiver partition 110, as well as the RID's for the relational rows written to disk during the first phase.

Once the second phase completes, the third phase of the data redistribution is performed. During the third phase, the sender partition 102 scans the index object 361 for index keys (step 416) and sends the keys to the DES 302 (step 417). Since the index keys are already sorted, the index keys may be efficiently scanned in order. For each index key, the DES 302 extracts the Doc ID referenced in the index key and performs a lookup in the temporary table 303 for a matching Doc ID (step 418). If there is a match, then this particular index key is to be redistributed (i.e., the index key references redistributed data). The DES 302 retrieves the receiver partition ID mapped to the matching Doc ID from the temporary table 303 (step 419) and sends the index keys in sorted order to the receiver partition 110 (step 420). The DES 302 may buffer the index keys and then send the buffer of keys to the receiver partition 110.

The DRS 304 at the receiver partition 110 receives the index keys in sorted order from the sender partition 102. The receiver partition 110 may also receive sorted index keys from other sender partitions, thus receiving multiple streams of sorted index keys (step 421). The DRS 304 merges these multiple streams of sorted index keys into a single stream of sorted index keys using an appropriate algorithm, such as a tournament tree algorithm (step 422). Since a path string can be repeated across partitions, the receiver partition may receive duplicate path index keys. In this embodiment, duplicate path index keys are disregarded, and the resulting single stream of sorted index keys contain unique index keys.

The DRS 304 then checks the temporary table 307 at the receiver partition 110 for the Doc ID referenced by the index keys (step 423). The DRS 304 gets the local RID's and XID's mapped to the matching Doc ID from the temporary table 307 (step 424). Since the index keys come from the sender partition 102, they contain the RID's and XID's relevant only to the sender partition 102. Thus, the DRS 304 replaces the RID in the index keys with the local RID from the temporary table 307 (step 425) so that the index key points to the appropriate record at the receiver partition 110. The DRS 304 also replaces the XID's in the index keys with the local XID's from the temporary table 307 so that these index keys point to the appropriate XML page(s) at the receiver partition 110. These modified index keys are then sent to a key generator (step 426), which creates the receiver index keys without traversing the base table objects. Note that this modification is not required for the path index keys, as the path ID's in the path index is universal for the database.

By sending the index keys separately from the relational and XML data, and building the index keys at the receiver partition without traversing the base table objects, the index key creation is decoupled from the data movement itself. Because the receiver index keys are created from the sender index keys, the receiver partition avoids rebuilding the index keys from scratch. Advantageously, traversal of the relational table objects by the receiver partition is not required. As a result, expensive scans, sorts, and CPU cycles are thus saved. As a further advantage, embodiments of the invention enable the receiver index keys to be created in any order, or even in parallel, allowing for more efficient creation of the keys. Although in the third phase the sender partition 102 scans the index object 361, the size of index objects are usually a fraction of the overall table data and XML data. As an additional advantage to the depicted embodiment of the present invention, no relational table scan, regions index lookup, or XML object page read are required in the building of the index keys. During the third phase, the index keys are scanned by the sender partition in order and sent to the receiver partition in order. The receiver partition thus receives the index keys already sorted, and these sorted keys can be immediately used to build the index at the receiver partition. Advantageously, doing so enables the index to be built at the receiver partition without performing any sorting or spilling operations. While a merge of the multiple streams of sorted index keys is required, as explained above, such a merge operation does not require disk spilling or significant sorting costs. As such, embodiments of the invention may improve the performance of the distributed database systems by enabling efficient creation of the index at the receiver partition. Furthermore, since the path ID's are universal for the database, no catalog node global path index lookups are required in building the receiver index keys. As a result, the path ID's that are already stored on the sender partition can be easily sent and written to the receiver partition without a lookup.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™ (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although the present invention has been described in the context of the redistribution of XML data stored in a relational database system, one of ordinary skill in the art will understand that the present invention may also be applied to any type of data where one data object have a reference and ownership to one or more records in another data object, without departing from the spirit and scope of the present invention. Furthermore, although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for redistributing data in a database system, comprising:
  receiving, from a sender partition, sender index keys referencing a document identifier and containing sender location identifiers;
  determining which receiver location identifiers are mapped to the document identifier referenced by the received sender index keys, based on a first set of receiver location identifiers corresponding to a first set of receiver locations containing relational data referencing the document identifier, and further based on a second set of receiver location identifiers corresponding to a second set of receiver locations containing document data corresponding to the document identifier, wherein the sender index keys are received separately from the relational data and the document data; and
  modifying, by operation of one or more computer processors, the sender index keys by replacing the sender location identifiers with the determined receiver location identifiers.

2. The method of claim 1, wherein storing the first set of receiver location identifiers mapped to the document identifier further comprises:
  receiving from the sender partition the relational data referencing an extensible markup language ("XML") identifier;
  storing the relational data at the first set of receiver locations assigned the first set of receiver location identifiers; and
  storing the first set of receiver location identifiers mapped to the XML identifier.

3. The method of claim 1, wherein storing the second set of receiver location identifiers assigned to the second set of receiver locations storing document data corresponding to the document identifier referenced by the relational data further comprises:
  receiving from the sender partition extensible markup language ("XML") data corresponding to an XML identifier referenced by the relational data;
  storing the XML data at the second set of receiver locations assigned the second set of receiver location identifiers; and
  storing the second set of receiver location identifiers mapped to the XML identifier.

4. The method of claim 1, wherein determining from the stored first set of receiver location identifiers and the stored second set of receiver location identifiers which receiver record identifiers are mapped to the document identifier referenced by the received sender index keys, further comprises:
  receiving from the sender partition separately from the relational data and extensible markup language ("XML") data, the sender index keys referencing an XML identifier, the sender index keys further comprising the sender location identifiers; and
  determining the receiver location identifiers mapped to the XML identifier referenced by the sender index keys.

5. The method of claim 1, wherein the storing the first set of receiver location identifiers mapped to the document identifier further comprises:
  scanning by the sender partition a relational object for a relational row;
  determining by the sender partition whether the relational row is to be redistributed;
  in response to determining that the relational row is to be redistributed, extracting by the sender partition an extensible markup language ("XML") document identifier ("Doc ID") referenced by the relational row;
  storing the Doc ID mapped to a receiver partition identifier at the sender partition, the receiver partition identifier identifying a receiver partition to which the relational row is to be redistributed; and
  sending the relational row to the receiver partition.

6. The method of claim 1, wherein the storing the first set of receiver location identifiers mapped to the document identifier further comprises:
  receiving by a receiver partition a relational row from the sender partition;
  writing the relational row to a record at the receiver partition, the record assigned a receiver record identifier ("RID"); and
  storing the receiver RID mapped to an extensible markup language ("XML") document identifier ("Doc ID") referenced by the relational row at the receiver partition.

7. The method of claim 1, wherein the storing the second set of receiver location identifiers mapped to the document identifier comprises:

scanning by the sender partition an XML object for an XML region;

extracting by the sender partition an extensible markup language ("XML") document identifier ("Doc ID") referenced by the XML region;

determining by the sender partition whether the extracted Doc ID exists at the sender partition;

in response to determining that the extracted Doc ID exists at the sender partition, retrieving a receiver partition identifier mapped to the extracted Doc ID, the receiver partition identifier identifying a receiver partition to which the XML region is to be redistributed; and sending the XML region to the receiver partition.

8. The method of claim 1, wherein the storing the second set of receiver location identifiers mapped to the document identifier further comprises:

receiving by the receiver partition an extensible markup language ("XML") region from the sender partition;

writing by the receiver partition the XML region to one or more XML pages, the XML pages assigned an XML page identifier ("XID"); and storing by the receiver partition at the receiver partition the XID mapped to an XML document identifier referenced by the XML region.

9. The method of claim 1, wherein receiving the sender index keys referencing the document identifier comprises:

scanning by the sender partition an index object for an index key;

extracting by the sender partition an extensible markup language ("XML") document identifier ("Doc ID") referenced by the index key;

determining by the sender partition whether the Doc ID referenced by the index key exists at the sender partition;

in response to determining that the Doc ID referenced by the index key exists at the sender partition, retrieving a receiver partition identifier mapped to the Doc ID, the receiver partition identifier identifying a receiver partition to which the index key is to be redistributed; and sending the index key to the receiver partition.

10. The method of claim 1, wherein receiving the sender index keys referencing the document identifier comprises:

receiving by a receiver partition a plurality of sorted index keys from a plurality of sender partitions; and merging by the receiver partition the plurality of index keys from the plurality of sender partitions into a single stream of sorted index keys.

11. The method of claim 1, wherein modifying the sender index keys by replacing the sender location identifiers with the determined receiver location identifiers further comprises:

extracting by a receiver partition extensible markup language ("XML") document identifiers ("Doc ID's") referenced by the index keys;

retrieving by the receiver partition receiver record identifiers ("RID's") and receiver XML page identifiers ("XID's") mapped to the Doc ID's from the temporary table at the receiver partition;

replacing sender RID's in the index keys with the retrieved receiver RID's; and replacing sender XID's in the index keys with the retrieved receiver XID's.

12. The method of claim 1, further comprising:

creating receiver index keys from the modified sender index keys.

13. A computer program product for redistributing data in a database system, the computer program product comprising:

a computer readable storage medium having computer readable program code embodied therewith, the computer readable program code comprising:

computer readable program code to receive, from a sender partition, sender index keys referencing a document identifier and containing sender location identifiers;

computer readable program code to determine which receiver location identifiers are mapped to the document identifier referenced by the received sender index keys, based on a first set of receiver location identifiers corresponding to a first set of receiver locations containing relational data referencing the document identifier, and further based on a second set of receiver location identifiers corresponding to a second set of receiver locations containing document data corresponding to the document identifier, wherein the sender index keys are received separately from the relational data and the document data; and computer readable program code to modify the sender index keys by replacing the sender location identifiers with the determined receiver location identifiers.

14. The computer program product of claim 13, wherein the computer readable program code configured to store the first set of receiver location identifiers mapped to the document identifier further comprises:

computer readable program code to receive from the sender partition the relational data referencing an extensible markup language ("XML") identifier;

computer readable program code to store the relational data at the first set of receiver locations assigned the first set of receiver location identifiers; and computer readable program code to store the first set of receiver location identifiers mapped to the XML identifier.

15. The computer program product of claim 13, wherein the computer readable program code configured to the second set of receiver location identifiers assigned to the second set of receiver locations storing document data corresponding to the document identifier referenced by the relational data further comprises:

computer readable program code to receive from the sender partition extensible markup language ("XML") data corresponding to an XML identifier referenced by the relational data;

computer readable program code to store the XML data at the second set of receiver locations assigned the second set of receiver location identifiers; and computer readable program code to store the second set of receiver location identifiers mapped to the XML identifier.

16. The computer program product of claim 13, wherein the computer readable program code configured to receive the sender index keys referencing the document identifier, and the computer readable program code to determine from the temporary table the receiver record identifiers corresponding to the document identifier referenced by the sender index keys, further comprises:

computer readable program code to receive from the sender partition separately from the relational data and extensible markup language ("XML") data, the sender index keys referencing an XML identifier, the sender index keys further comprising the sender location identifiers; and computer readable program code to determine the receiver location identifiers mapped to the XML identifier referenced by the sender index keys.

17. The computer program product of claim 13, wherein the computer readable program code configured to store the first set of receiver location identifiers mapped to the document identifier further comprises:

computer readable program code to receive by the receiver partition a relational row from the sender partition;

computer readable program code to write the relational row to a record at the receiver partition, the record assigned a receive record identifier ("RID"); and computer readable program code to store the receiver RID mapped to an extensible markup language (XML) document identifier ("Doc ID") referenced by the relational row at the receiver partition.

18. The computer program product of claim 13, wherein the computer readable program code configured to store the second set of receiver location identifiers mapped to the document identifier further comprises:

computer readable program code to receive by the receiver partition an extensible markup language ("XML") region from the sender partition;

computer readable program code to write by the receiver partition the XML region to one or more XML pages, the XML pages assigned an XML page identifier ("XID"); and computer readable program code to store the XID mapped to an XML document identifier referenced by the XML region at the receiver partition.

19. The computer program product of claim 13, wherein the computer readable program code to modify the sender index keys by replacing the sender location identifiers with the determined receiver location identifiers further comprise:

computer readable program code to extract by a receiver partition extensible markup language (XML) document identifiers ("Doc ID's") referenced by the index keys;

computer readable program code to retrieve by the receiver partition receiver record identifiers ("RID's") and receiver XML page identifiers ("XID's") mapped to the Doc ID's from the temporary table at the receiver partition;

computer readable program code to replace sender RID's in the index keys with the retrieved receiver RID's; and computer readable program code to replace sender XID's in the index keys with the retrieved receiver XID's.

20. A system, comprising:

a sender partition storing relational data referencing an document identifier and document data corresponding to the document identifier; and a receiver partition operatively coupled to the sender partition, the receiver partition comprising:

a computer processor; and a memory containing a program that, when executed by the computer processor, performs an operation for redistributing data in a database system, the operation comprising:

receiving, from a sender partition, sender index keys referencing a document identifier, and containing sender location identifiers;

determining which receiver location identifiers are mapped to the document identifier referenced by the received sender index keys, based on a first set of receiver location identifiers corresponding to a first set of receiver locations containing relational data referencing the document identifier, and further based on a second set of receiver location identifiers corresponding to a second set of receiver locations containing document data corresponding to the document identifier, wherein the sender index keys are received separately from the relational data and the document data; and modifying, by operation of one or more computer processors, the sender index keys by replacing the sender location identifiers with the determined receiver location identifiers.

\* \* \* \* \*